No. 692,135. Patented Jan. 28, 1902.
F. HANSEN.
BALL BEARING.
(Application filed Feb. 26, 1901.)
(No Model.)
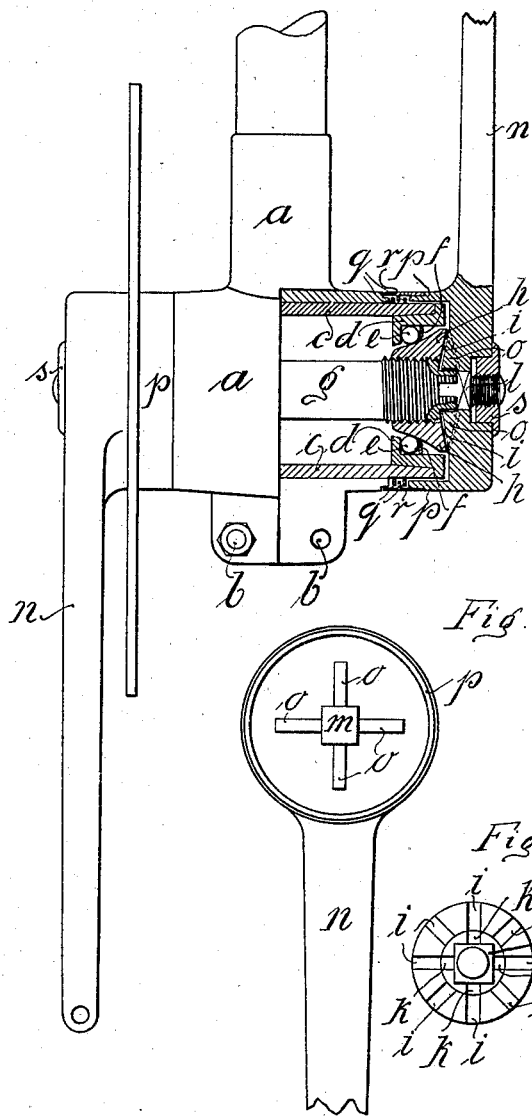

UNITED STATES PATENT OFFICE.

FRIEDRICH HANSEN, OF HUSUM, GERMANY.

BALL-BEARING.

SPECIFICATION forming part of Letters Patent No. 692,135, dated January 28, 1902.

Application filed February 28, 1901. Serial No. 49,294. (No model.)

*To all whom it may concern:*

Be it known that I, FRIEDRICH HANSEN, mechanic, of 5 Neustadt, Husum, in the Province of Schleswig-Holstein, Kingdom of Prussia, German Empire, have invented new and useful Improvements Relating to Ball-Bearings, (for which patent applications are made in Germany, filed January 17, 1901, and in Great Britain, filed January 28, 1901,) of which the following is a specification.

This invention relates to ball-bearings for cranks of cycle and other purpose whereby the locating of the ball-bearing within the interior of the hollow boss of the crank, which projects over the socket ends, enables such bearing to be rendered dust-proof and in which the adjustable cone is secured in position by the crank-box.

In order that my invention may be readily understood and carried into effect, I will describe the same fully with reference to the accompanying drawings, in which—

Figure 1 is a rear view, partly in section, of a cycle-crank and crank-bracket constructed in accordance with my invention. Figs. 2 and 3 are details of the same.

In the socket $a$ of the crank-bracket is fitted a tube $c$ $c$, secured in position by tightening the screws $b$ $b$. This tube $c$ $c$ is formed with internally-tapering ends for the reception of conical cups $d$. The inner portions of these cups form a sufficiently large channel in the direction of its longitudinal axis for the reception of the balls $e$ and a thin ring $f$, adapted to prevent the balls from falling out. This conical cup $d$ has also an annular flange, made integral therewith, extending outwardly and which engages the end of the tube $c$ for the purpose of holding the cup $d$ in position. The periphery of this cup is tapered, conforming to the taper of the tube $c$, which it engages. The crank-axle $g$ passes through the said tube, and both ends of the same are formed with a screw-threaded portion, upon which are screwed the cones $h$, running upon the balls $e$. Each of these cones is formed on its outer face with radial grooves $i$ and $k$, the four latter of which are continued down into the crank-shaft. Externally of the cones the crank-shaft is formed with a square portion $l$, upon which fit the cranks $n$ by means of a square hole $m$. To prevent the cones from being displaced after adjustment, it is advisable to provide the cranks at their inner sides with ribs $o$, adapted to engage in the grooves of the cones and at the same time also in the recesses $k$ in the crank-axle, and thereby form an additional means for securing the crank on the axle. With this arrangement of cones, formed with eight grooves $i$ $k$, the cones may be adjusted by one-eighth of a screw-thread.

For the purpose of rendering the bearing dust-proof the crank is formed with a concentric rim $p$, projecting over the ends of the tube $c$. Between the rim $p$ and the socket $a$ are fitted upon the tube $c$ three rings $q$ $q$ $r$, the two outer ones $q$ $q$ of which are of rectangular section and tightly fitted upon the tube $c$, while the central one, of T-shaped section, is fixed to the rim of its crank and turns with the latter. The cranks are secured on the crank-axle by means of a nut $s$, sunk from the exterior into the crank.

For readjusting the cones the crank is removed and the cone then rotated, as may be required, while care must be taken to finally place the radial grooves of the cone so as to coincide with the recesses in the crank-axle. This may be facilitated by forming a greater number of radial grooves in the cones. After roughly adjusting the cones they are slightly turned back, or if possible forward, to fully correspond with the grooves in the shaft, as this will have no perceptible influence on the bearing.

What I claim as my invention, and desire to secure by Letters Patent, is—

In a device of the character described, an axle having a square end, a cone carried by the axle, the outer face of said cone having a series of radial grooves formed therein extending down to the crank-axle, a crank, radial ribs on the inner face thereof adapted to engage said radial grooves in the cone, said crank having a square aperture formed therein to receive said square end of the axle, substantially as described.

In testimony whereof I affix my signature in presence of two witnesses.

FRIEDRICH HANSEN.

Witnesses:
  E. H. L. MUMMENHOFF,
  OTTO W. HELLMRICH.